INVENTOR:—
ROBIN MICHAEL DAKIN

United States Patent Office 3,447,317
Patented June 3, 1969

3,447,317
COMBUSTION CHAMBER
Robin Michael Dakin, Ansty, England, assignor to Bristol Siddeley Engines Limited, London, England
Filed Apr. 7, 1967, Ser. No. 629,211
Claims priority, application Great Britain, Apr. 20, 1966, 17,196/66
Int. Cl. F02c 1/00; F23m 9/00
U.S. Cl. 60—39.65   6 Claims

ABSTRACT OF THE DISCLOSURE

A flame-tube, for a gas turbine combustion chamber, having an inwardly-concave, upstream end wall formed from overlapping, co-axial frusto-conical rings spaced apart radially. The portions of the frusto-conical surfaces of the rings which are exposed to the interior of the flame-tube together define the concave inner surface of said end wall. The overlapping portions of each pair of adjacent rings define an annular passage, open at each end, through which air is introduced into the flame-tube, to cool the whole of the ring surfaces.

---

The invention relates to a combustion chamber for a gas turbine engine and is particularly concerned with the construction of the upstream end wall of a flame-tube of a combustion chamber.

The flame-tube may be either cylindrical or annular and, in either case, the upstream end wall thereof is concave with respect to the interior of the flame-tube. It is known to pass cooling air over the inner surfaces of the upstream end wall; but, especially where the wall is concavely curved, as viewed in axial cross-section, there is a tendency for the cooling air flow to become unstable when passing over the curved inner surface and causing vortices to be formed, resulting in intense burning, especially at the downstream edge of the wall, leading to cracking thereof. An object of the invention is to provide a flame-tube in which the upstream end wall thereof is so constructed as to facilitate it being efficiently cooled and to reduce or eliminate the formation of such vortices and the damage resulting therefrom.

According to the invention, a flame-tube for a gas turbine combustion chamber has an upstream end wall formed from a plurality of co-axial, frusto-conical rings, spaced apart radially one from another with a portion adjacent the downstream end of each ring, except the radially outermost one, inserted within an adjacent upstream end portion of the next radially-outer ring, whereby the rings partially overlap, the portions of the frusto-conical surfaces exposed to the interior of the flame-tube together defining the concave inner surface of said end wall and the overlapping portions of each pair of adjacent rings defining an annular passage, open at each end thereof, through which air is introduced into the flame-tube, during operation of the combustion chamber, to cool the whole of the ring surfaces.

Successive rings in the downstream direction of the flame-tube may be of decreasing cone-angle, thereby to direct the air introduced through the annular passage at the upstream end of a ring into intimate contact with the portion of the frusto-conical surface thereof which is exposed to the interior of the flame-tube.

The rings may conveniently be supported by vanes engaging the upstream frusto-conical surfaces of the rings. The vanes may be arranged tangentially to a circle co-axial with the rings, thereby to produce swirl in the air introduced through the said annular passages. The radially-outer extremity of each ring is preferably unsupported by the vanes.

The invention also includes a combustion chamber having a flame-tube as set out in any one of the preceding three paragraphs.

By way of example, a combustion chamber for a gas turbine engine and including a cylindrical type of flame-tube in accordance with the invention will now be described with reference to the accompanying drawings, in which.

Figure 1:
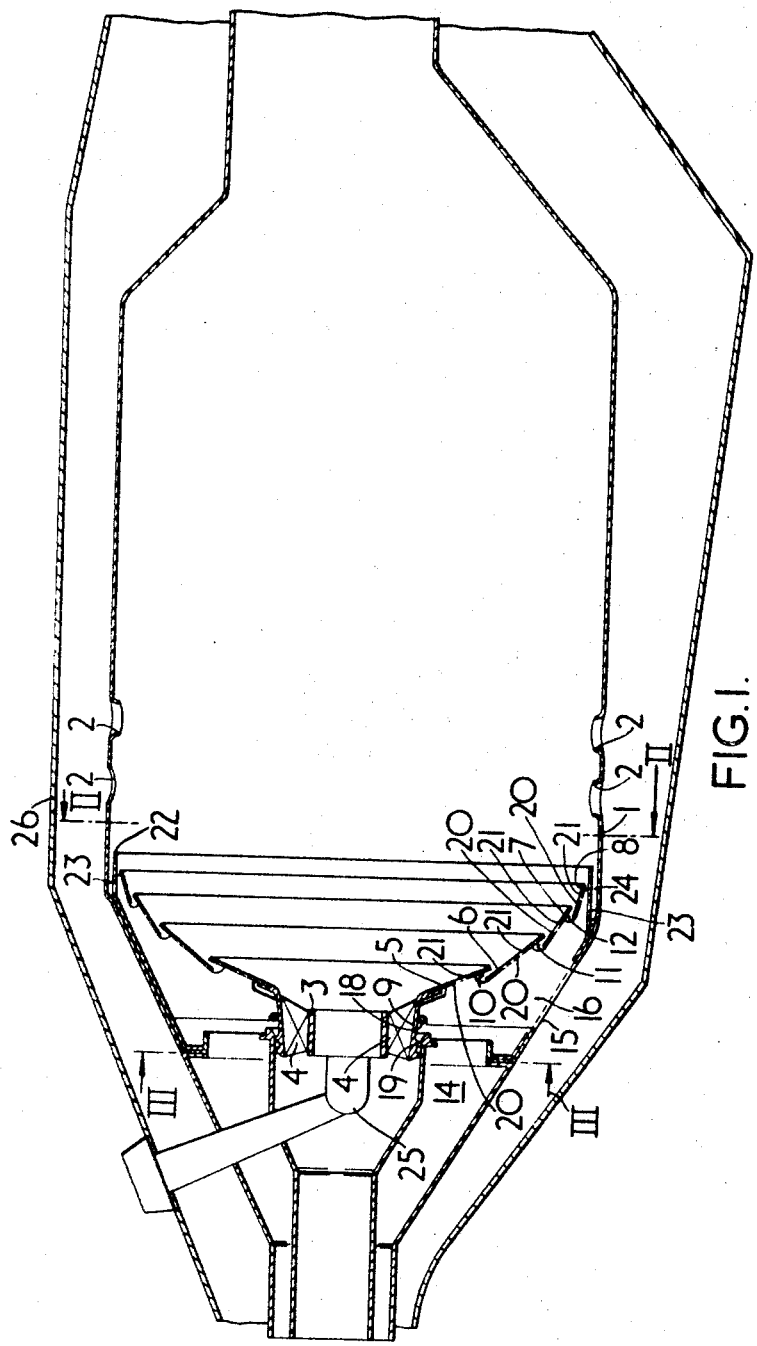
FIGURE 1 is an axial section through the combustion chamber.

The flame-tube comprises a cylindrical wall 1, provided with air inlet holes 2 in known manner, and an upstream end wall containing a central aperture 3 for receiving a burner nozzle 25, shown in FIGURE 1 only. The aperture 3 is surrounded by a ring of swirl-producing vanes 4. In accordance with this invention, the upstream end wall is formed from a plurality, e.g. four, partially-overlapping, co-axial, frusto-conical rings 5, 6, 7 and 8. The innermost ring 5 has an integral spigot portion 9 on the inner surface of which are carried the swirl-producing vanes 4. The portions of the frusto-conical surfaces of the rings 5, 6, 7 and 8 exposed to the interior of the flame-tube together define the required concave shape of the inner surface of the upstream end wall. The rings are spaced apart radially to define therebetween annular passages 10, 11, 12 through which cooling air is passed, during operation of the combustion chamber, which also includes an outer casing 26, shown in FIGURE 1. The cooling air flows through the annular passages 10, 11, 12 into the interior of the flame-tube from a space 14 defined by the outer surfaces of the rings 5, 6, 7 and 8 and an annular extension 15 of the upstream end of the cylindrical wall 1. The cone-angles of successive rings 5, 6, 7, 8 are of decreasing magnitude and so the air introduced through each radially-converging passage 10, 11, 12 is constrained to flow in intimate contact with the downstream portion of the internal surface of the respective rings 6, 7, 8, thereby forming a strong boundary layer thereon and, together with the air flow over the outer surface of the ring, cooling it.

Figure 2:
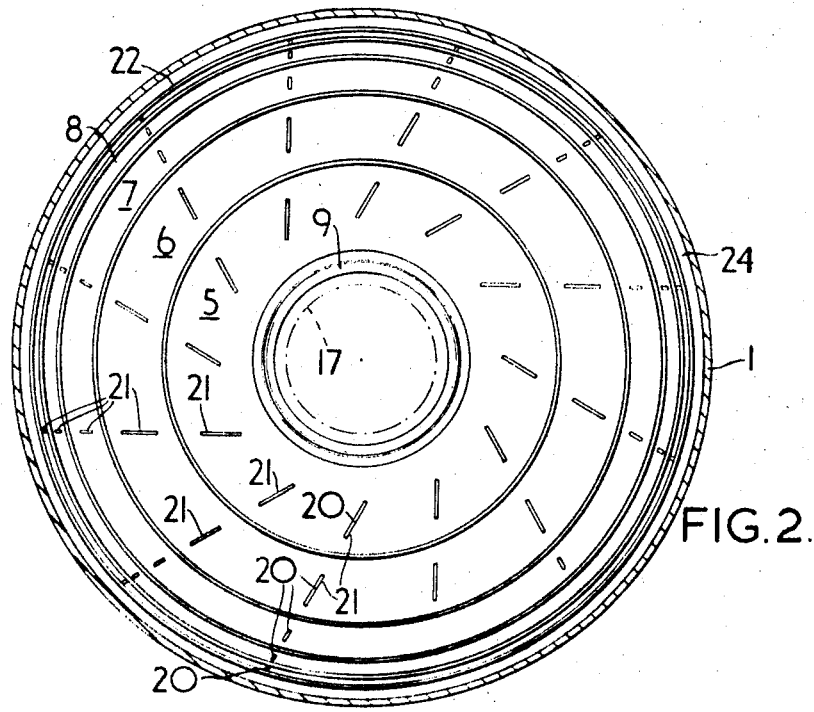
FIGURE 2 is a section showing the upstream end of the flame-tube on the line II—II in FIGURE 1 to a slightly larger scale.
Figure 3:
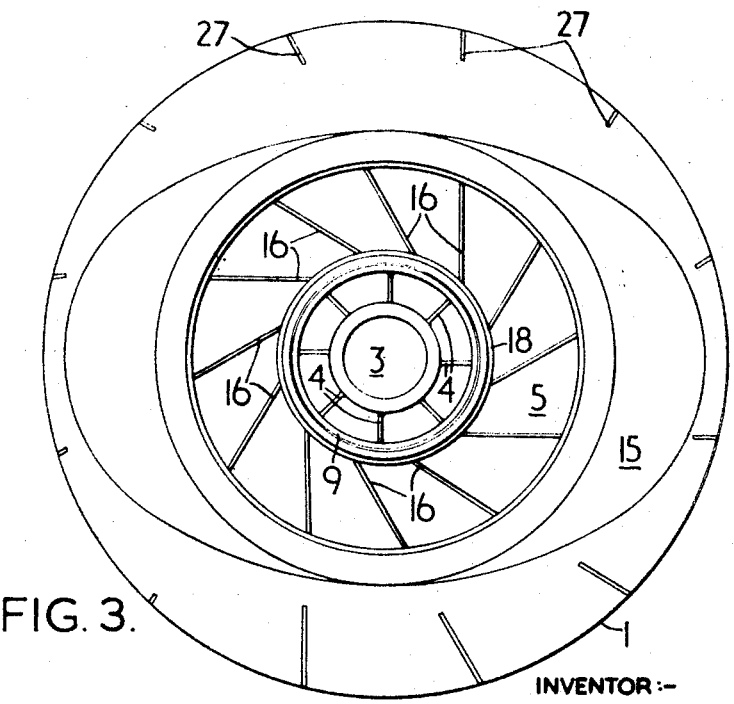
FIGURE 3 is a section showing the upstream end of the flame-tube on the line III—III in FIGURE 1 to a slightly larger scale.

The rings 5, 6, 7 and 8 are attached at their upstream frusto-conical surfaces to vanes 16 which extend tangentially to an imaginary circle 17 (See FIGURE 2) co-axial with the rings. The vanes 16 are located with respect to the rings 5, 6, 7 and 8 by tongues 20 extending from the vanes and engaged in slots 21 in the rings and welded therein. The vanes 16 are similarly located and welded in slots 27 in the extension 15 of the wall 1 and are arranged to impart a swirl to the cooling air passing through the annular passages 10, 11, 12 in the same direction as that imparted by the swirl vanes 4. This has the effect of reducing the tendency for hot and cold air streams to mix and thereby assists the production of an even cooling air flow across the inner surfaces of the rings 6, 7 and 8. The swirl velocity of the air that has entered through the annular passages 10, 11, 12 reduces as the radial distance from the axis of the flame-tube increases. The vanes 16 also form cooling fins at the back of the rings 5, 6, 7, 8. Also by arranging the vanes 16 tangentially to the circle 17 relatively small forces will be produced in the rings and the vanes when expansion of the rings occurs.

A circular piece of wire 18 is welded or brazed to the inner ends of the vanes 16 which have clearance from the spigot portion 9. This acts as a stop to be engaged by a flange 19 at the left-hand end of the spigot portion 9, as shown in FIGURE 1, if the ring 5 should become detached from the vanes 16. In this way axial movement into the flame-tube of the ring 5, if it should become detached from the vanes 16, would be limited. The ring 5 would likewise restrain axial movement of the ring 6 which in turn would similarly restrain the ring 7, if they should become detached from the vanes 16. If a vane 16 became detached it would lodge against an adjacent vane and the cooling air flow would remain substantially undisturbed. The radially outermost ring 8 is very strongly attached to the vanes 16 and is not likely to become detached therefrom. The radially-outer extremities of the rings 5, 6, 7 and 8 are not attached to the vanes 16 and so if any local overheating of the extremities should occur, no excessive stresses in the combined structure formed by the rings 5, 6, 7 and 8 and the vanes 16 will be produced. If local overheating of a ring 5, 6, 7 or 8 should occur it would expand radially outwardly. It would also tend to heat the adjacent radially-outer ring which would also expand, thereby substantially restoring the size of the annular passage between the two adjacent rings. Thus the effect of overheating of the innermost ring would be dissipated rapidly over the combined ring structure.

Between the ring 8 and the casing 1, and radially spaced from each, there is an axially-extending ring 22 attached to the extension 15 of the wall 1. A circumferential series of holes 23 is provided in the ring 22, whereby air from the space 14 can be directed through them into the annular space 24 between the ring 22 and the wall 1, where the air is constrained to flow axially as a strong cooling layer in intimate contact with the inner surface of the wall 1. Air from the space 14 also passes through the annular space between the rings 8 and 22 and forms a cooling layer over that part of the inner surface of the ring 22 which is exposed to the interior of the flame-tube.

Although the upstream end wall described herein is in a cylindrical type of flame-tube, a wall of similar construction can be provided in an annular flame-tube.

What I claim as my invention and desire to secure by Letters Patent of the United States is:

1. A flame-tube, for a gas turbine combustion chamber, having an inwardly-concave, upstream end wall formed from a plurality of co-axial, frusto-conical rings spaced apart radially one from another, with a portion adjacent the downstream end of each ring, except the radially outermost one, inserted within an adjacent, overlapping, upstream end portion of the next radially-outer ring, the portions of the frusto-conical surfaces exposed to the interior of the flame-tube together defining the concave inner surface of said end wall and the overlapping portions of each pair of adjacent rings defining an annular passage, open at each end thereof, through which air is introduced into the flame-tube to cool the whole of the ring surfaces, wherein the improvement comprises a plurality of vanes supporting said rings, said vanes being tongues engaged in slots in said rings.

2. A flame-tube as claimed in claim 1 in which successive rings in the downstream direction of the flame-tube are of decreasing cone-angle.

3. A flame-tube as claimed in claim 1 in which said vanes are tangential to a circle co-axial with said rings, thereby to produce swirl in the air introduced through said annular passages.

4. A flame-tube as claimed in claim 1 in which the radially-outer extremity of each said ring is unsupported by said vanes.

5. A flame-tube as claimed in claim 1 in which the radially innermost ring has a radial projection thereon and said vanes carry an abutment engageable by said radial projection, whereby the axial movement of the said ring in the downstream direction will be limited in the event of the said ring becoming detached from the vanes.

6. A flame-tube, for a gas turbine combustion chamber, having an inwardly-concave, upstream end wall formed from a plurality of co-axial, frusto-conical rings spaced apart radially one from another, with a portion adjacent the downstream end of each ring, except the radially outermost one, inserted within an adjacent, overlapping, upstream end portion of the next radially-outer ring, the portions of the frusto-conical surfaces exposed to the interior of the flame-tube together defining the concave inner surface of said end wall and the overlapping portions of each pair of adjacent rings defining an annular passage, open at each end thereof, through which air is introduced into the flame-tube to cool the whole of the ring surfaces, said flame-tube also including a plurality of ring-supporting vanes engaging said rings, wherein the improvement comprises the radially innermost ring having a radial projection thereon and said vanes carrying an abutment engageable by said radial projection, whereby the axial movement of the said ring in the downstream direction will be limited in the event of the said ring becoming detached from the vanes.

References Cited
UNITED STATES PATENTS

| | | | |
|---|---|---|---|
| 1,322,999 | 11/1919 | Bester | 60—39.65 |
| 2,555,965 | 6/1951 | Garber | 60—39.65 |
| 2,603,064 | 7/1952 | Williams | 60—39.65 |
| 2,734,560 | 2/1956 | Harris et al. | 60—39.65 |
| 2,907,171 | 10/1959 | Lysholm | 60—39.65 |
| 3,119,234 | 1/1964 | Murray et al. | 60—39.65 |

CARLTON R. CROYLE, *Primary Examiner.*